Oct. 11, 1932.   G. F. MACHLET   1,881,773
SYNCHRONIZING DEVICE
Filed Feb. 9, 1929   2 Sheets-Sheet 1

Inventor
George F. Machlet
By B. L. Stickney
his Attorney

Oct. 11, 1932.  G. F. MACHLET  1,881,773
SYNCHRONIZING DEVICE
Filed Feb. 9, 1929  2 Sheets-Sheet 2
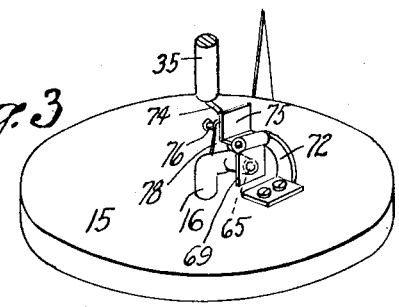
Fig. 3
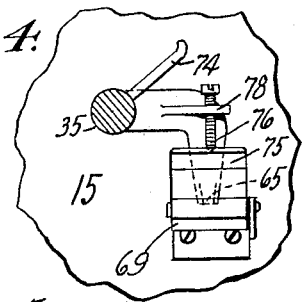
Fig. 4
Fig. 5
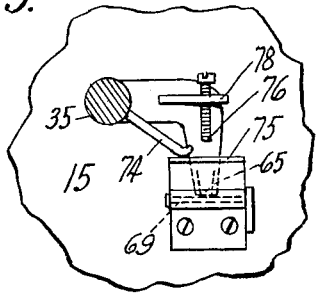
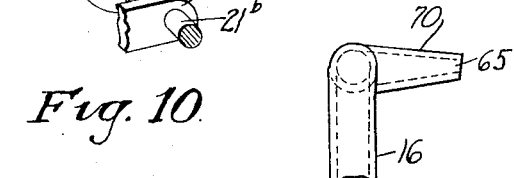
Fig. 10
Fig. 6
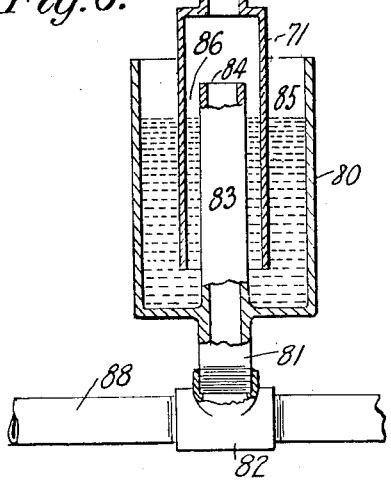
Fig. 7
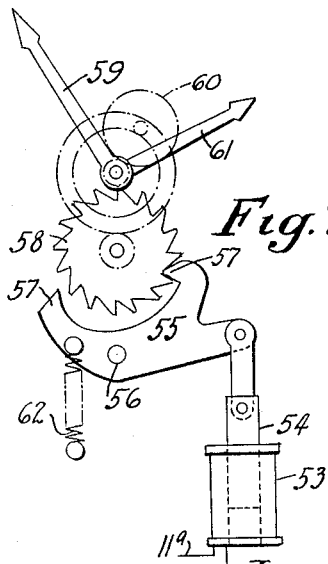
Fig. 8
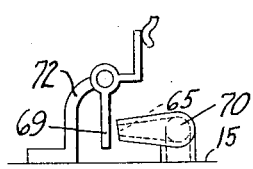
Fig. 9
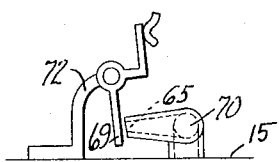
Inventor
George F. Machlet
By B. C. Stickney
his Attorney Patented Oct. 11, 1932

1,881,773

UNITED STATES PATENT OFFICE

GEORGE F. MACHLET, OF ELIZABETH, NEW JERSEY

SYNCHRONIZING DEVICE

Application filed February 9, 1929. Serial No. 338,692.

This invention relates to means for regulating the speed of various kinds of apparatus so that said speed is exactly synchronized either to particular time intervals as measured by a master-clock, or to the speed of any other master or governing device. An object of the invention is to provide means for doing this without the use of intricate and therefore unstable mechanism. Another object of the invention is that the operation of said means shall be entirely automatic but nevertheless reliable and sensitive. The invention is carried out by means including a manometric pressure-device whereby the apparatus to be regulated is caused to rotate in synchronism with a master rotating member which, in the herein illustrated embodiment of the invention, is geared to the driving mechanism of a master-clock. It is assumed that the apparatus to be regulated is driven by a motor or equivalent device, the speed of which may be varied. For illustrative purposes, let it be asumed that the motor is an electric motor and that its speed is controlled by means of the usual variable resistance interposed in the circuit of the motor.

A rotatable member, which may be called a test member, is positively driven by the apparatus to be regulated and is geared thereto in such a way that, at the desired speed of the apparatus, said test member rotates in synchronism with the master-member. Said test member and master-member may be characterized by disks, the axes of which may coincide so that the disks face each other. For the purposes of the invention, the faces of the disks are separated sufficiently to afford sufficient room between said faces for part of the means whereby the speed of rotation of the disks is synchronized. As long as the disks rotate in synchronism, it is evident that there will be no relative displacement of said disks. However, if the test disk, which is geared to the apparatus to be regulated, moves faster or slower than the master-clock disk, then there will be a relative rotary displacement between the two disks. By means of said relative displacement of the disks, when the apparatus or test disk moves out of synchronism or into synchronism with the master-clock disk, there is controlled a relief outlet of the aforesaid manometric pressure-device. The manometric pressure-device also includes a diaphragm which is controlled by said relief outlet and to which is operatively connected a lever which, in the illustrated embodiment of the invention, is used to cut in or cut out portions of the resistance whereby the speed of the motor is regulated. The manometric pressure-device may be of the type shown in my co-pending application, Serial No. 162,589, filed January 21, 1927 (now Patent No. 1,763,666, dated June 17, 1930), and includes, besides the aforesaid relief outlet and diaphragm, a source of air-supply which is supplied to the diaphragm under pressure, and consequently inflates said diaphragm. The extent to which said diaphragm is inflated depends upon the pressure impressed thereon.

The relief outlet is at the end of a branch of the pipe which directs the air-pressure for inflating the diaphragm, and, by means of a mercury-seal device forming part of said branch, the relief outlet is arranged to rotate with the master-clock disk. An adjustable closure for said relief outlet is also arranged to rotate with said master-clock disk. Associated with the test disk of the apparatus to be regulated there may be a projection which normally contacts with the relief-outlet closure on the master-disk in such a way that, when the two disks rotate in synchronism, the relief outlet is either entirely closed or closed just enough to maintain a predetermined and normal extent of inflation of the diaphragm of the manometric pressure-device. The diaphragm, when thus inflated to its normal extent, holds a resistance-regulating lever in such position that the motor runs at the proper speed to keep the apparatus or test disk in synchronism with the master-clock disk.

Should the motor and the apparatus, which it drives, gain in speed there will be a rotary displacement of the test disk relatively to the master-clock disk, and such displacement may cause the aforesaid projection associated with the apparatus-disk to recede from the relief-outlet closure on the master-clock disk and cause said closure to open the relief outlet. In the ensuing abnormal dissipation of the pressure in the manometric device through the relief outlet, there will be a partial or complete collapse of the diaphragm, which in turn causes the resistance-regulating lever to be moved to cut in more resistance. The speed of the motor will thereupon be reduced and, in the counterwise rotary displacement of the two disks as the apparatus-disk attains synchronism with the master-clock disk again, the closure for the relief outlet will reassume its normal position. As the closure reassumes its normal position, there is a recovery of pressure in the manometric device with a consequent cutting down of the motor-resistance to maintain the re-established synchronous speed.

Conversely, if the speed of the motor and the apparatus to be regulated, falls below normal, the apparatus-disk will be displaced relatively to the master-disk in such a way as to cause the closure to more effectively close the relief outlet. There will, in consequence, be a rise in pressure in the manometric pressure-device, causing the diaphragm to be expanded beyond its normal extent. The diaphragm in thus expanding will cause the resistance-regulating lever to cut out a portion of the resistance which is normally interposed in the motor-regulating circuit. It may be mentioned that under normal conditions, that is, when the two disks are in synchronism, a complete closure of the relief outlet is not desired, if two-way regulation is required.

In the illustrated embodiment of the invention, the apparatus to be regulated is a revolving device for making and breaking current-supplying circuits for a series of solenoids, each of which is used to actuate a repeater clock. The solenoids may be actuated once in every minute as measured by the master-clock, and by means of a suitable escapement-drive each solenoid may move the hands of its repeater clock. Thus, at the lapse of every minute on the master-clock, the solenoids, energized by means of said revolving device, will cause the minute-hands of the repeater clocks to move one minute-space with, of course, a corresponding movement of the hour-hands of said clocks. The revolving contact-making-and-breaking device may be driven by a small motor having sufficient power to make and break the desired contact, and includes the aforesaid apparatus or test disk which is to be synchronized to the master-disk which is geared to the master-clock. The master-disk and its train of connections to the master-clock mechanism are to be mounted with the required delicacy of construction usual in clock-mechanisms to avoid friction. There is provided as part of the invention, and in accordance with said delicate construction and its purpose, the aforesaid mercury-seal device whereby the air to be dissipated through the relief outlet associated with the master-clock disk may be conveyed to said outlet while the master-clock disk is rotated. The contact-making-and-breaking parts of the revolving device are of elementary form, as shown in the illustrated embodiment of the invention. They may be elaborated, however, to any extent desired, as for example, for the purpose of effecting quick making and breaking of the contacts, or for the purpose of affording sufficient current-carrying capacity: The master-clock is shown as driven by a weight and controlled by the usual pendulum.

Aside from the trains of driving mechanisms for the test and master disks and the disks themselves, there are substantially no other revolving parts than the aforesaid relief outlet, its closure, and the arm or projection controlling said closure. In accordance with the objects of the invention there is thus provided a synchronizing device that is simple in character, automatic, reliable and sensitive in operation.

Other features and advantages will hereinafter appear.

In the accompanying drawings,

Figure 3 is a perspective view of the master-clock disk showing the relief outlet which moves with said disk, and the closure for controlling said relief outlet.

Figures 4 and 5 are fragmentary top-plan views of the master-clock disk showing the relief outlet open in Figure 4 and closed in Figure 5.

Figure 6 is an enlarged view showing details of construction of the mercury-seal device.

Figure 7 is a diagrammatic elevational view indicating means whereby the hands of each repeater clock may be controlled by its solenoid.

Figure 8 is an enlarged view, showing the normal relation of the relief-outlet closure with respect to the relief outlet.

Figure 9 is a view similar to Figure 8, but shows the position the closure assumes relatively to the relief outlet when the apparatus or test disk to be regulated lags behind the master disk.

Figure 10 is a perspective view of means for smoothing out the impulses, whereby the master clock drives the master disk, said impulses arising from the beats due to the escapement-actuated mechanism of the master clock.

Figure 1:
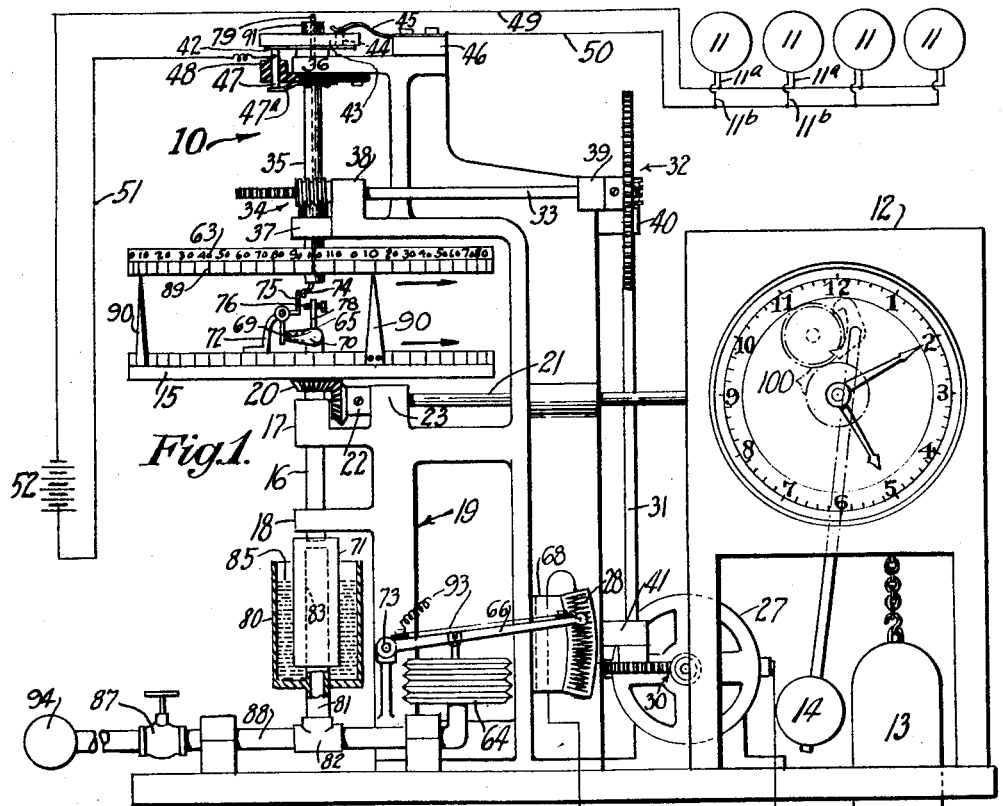
Figure 1 is a diagrammatic arrangement, in elevation, showing the apparatus in which the invention is embodied.

A revoluble device, generally indicated by the number 10, is used for periodically making and breaking a circuit which includes operating solenoids for a series of repeater clocks 11. Details of the mechanism whereby a solenoid controlled by said device may actuate a repeater clock are shown in Figure 7, and will be described later on. In Figure 1, the repeater clocks 11 and the terminals for the solenoids of the respective repeater clocks are indicated diagrammatically. The repeater clocks are to be controlled by a master clock 12, which may be driven by a weight 13 and controlled by a pendulum 14. The interior mechanism of the master clock 12 driven by the weight 13, is connected to an external mechanism which includes a master disk 15, with which said revoluble device 10 is to be synchronized. Said master disk is fastened to a spindle 16, which is journaled in bearings 17 and 18. The bearings 17 and 18 are part of a main frame generally indicated by the number 19, and in which, as will be seen in Figure 1, other parts of the apparatus, to be described, are mounted. The spindle 16 is disposed vertically, and has keyed thereon, underneath the disk 15, a pinion 20, whereby said disk and spindle may be connected to the master-clock mechanism by means of a horizontal, connecting shaft 21. One end portion of said connecting shaft 21 has fastened thereto a beveled pinion 22, which meshes with said pinion 20, and said one end portion is journaled in a bearing 23, forming part of the main frame 19. The opposite end portion of said connecting shaft 21 carries a beveled pinion 24, and is journaled in a bracket 25 fastened to the rear of the master clock in such position, that said latter pinion 24 may mesh with and be driven by a pinion 26, which may be secured to or otherwise driven by the anchor-wheel shaft of the master-clock mechanism. The pinions 20, 22, 24 and 26 are so proportioned that the disk 15 makes exactly one revolution in a time interval of one minute.

The revoluble device 10 is preferably driven by an electric motor 27, which may have its speed varied by varying the amount of resistance 28 which is interposed in the circuit of the motor. The motor 27 is supplied with current from a source conventionally indicated at 29. The speed ratio of the motor 27 to the revoluble device 10 is very high, and, since the revoluble device 10 is to revolve once in every minute, said speed ratio is equal to the R. P. M. of the motor 27. Three worm and worm-wheel sets may be used to effect the required speed-reduction of the revoluble device 10. One set 30 connects the motor-shaft 27ª to a vertical shaft 31, extending upwardly toward the revoluble device 10. An intermediate set 32 connects said vertical shaft 31 to a horizontal shaft 33, and the third set 34 connects said horizontal shaft with a spindle 35 of the revoluble device 10. Said spindle is journaled in bearings 36 and 37 formed in the upper portion of the aforesaid main frame 19. Said main frame also includes bearings 38 and 39 of the horizontal shaft 33, and bearings 40 and 41 for the vertical shaft 31.

Elementary means, whereby the revoluble device 10 may make and break the solenoid-circuit for the repeater clocks 11, include a disk or ring 42 of conducting material, which is insulated by being mounted upon a disk 43 of insulating material, said latter disk being keyed to the spindle 35 of the revoluble device. A projection 44 from the disk or ring 42 of conducting material projects through the disk 43 of insulating material, and has its upper surface flush with the upper surface of said latter disk, as shown in Figure 1. A resilient brush-device 45, mounted upon the upper end of the main frame 19 and insulated therefrom by means of a block 46, rubs upon the upper surface of the disk 43, and has an end which may make contact with the upper surface of said projection 44 as said latter projection revolves. A continuous rubbing contact against the under side of the disk 42 of conducting material may be effected by means of a spring-pressed brush-device 47. Said latter brush-device, in the form of a plunger pressed by a spring 47ª against said disk 42, is retained in a bracket 48 of insulating material, which may be secured to the main frame in the manner indicated in Figure 1. A lead wire 49 connects a source of current-supply 52 and one set of similar terminals 11ª of the solenoids for operating the repeater clocks 11. The other set of solenoid-terminals 11ᵇ is connected to the source of current-supply by means which include the intermittent contact-device just described. For this purpose, there is a lead wire 50 from the latter set of solenoid-terminals 11ᵇ to the brush-device 45 of the revoluble contact-device, and another lead wire 51 from the other brush-device 47 to the source of current-supply 52.

As shown in Figure 7, a repeater clock solenoid 53 has a core 54 connected to an anchor 55 pivoted at 56. Said anchor 55 has suitable pallets 57, which coact with a toothed wheel 58 for driving the minute-hand 59 of a repeater clock one minute-space forward, as said solenoid, at the lapse of every minute, is energized. Suitable gearing indicated at 60 may connect the minute-hand 59 and the hour-hand 61, and cause the hour-hand to be advanced proportionately to the advance of the minute-hand. When the solenoid-circuit is closed by means of the revoluble contact-device herein described, each solenoid will be energized, thereby causing the retraction of its core to effect a corresponding clockwise rotation of the anchor 55 about its pivot. When the current is broken and the solenoids are de-energized thereby, the anchor 55 is caused to rotate about its pivot in an opposite direction by means of a spring 62 which pulls upon said anchor. Thus, at each make and break of the solenoid-circuit by means of the revoluble device 10, there is a complete oscillation of the anchor 55, which causes the minute-hand 59 to advance one minute-space with a proportionate advance of the hour-hand.

The means whereby the rotation of the revoluble device 10 is synchronized with the master-clock-controlled master disk 15 will now be described, and it will be evident that said means are useful for many other purposes beside that shown herein as an illustrative embodiment of the invention.

The aforesaid master disk 15 and the spindle 16, whereby said disk is rotated, form part of the means whereby synchronism in the speed of said revoluble device is attained. The spindle 35 of the revoluble device 10 has keyed to its lower end portion a disk 63, which may be called a test disk and is similar to the master disk 15. A manometric pressure device including a diaphragm 64 is controlled by variations from synchronism in the speed of said test disk 63 relatively to said master disk 15. Said disks may be regarded as characterizing the revoluble device 10 and the master clock 12 with which said device is to be synchronized. The manometric pressure device thus controlled has a fluctuating pressure to which said diaphragm responds, to the end that there may be cut-out or cut-in portions of the resistance 28, whereby the speed of the motor 27 is regulated. Should the revoluble device 10 attain a speed greater than that of the master disk 15, a relief outlet 65 of said manometric pressure device is caused to be opened, and results in an abnormal dissipation of the pressure in said manometric pressure device. In the ensuing partial or complete collapse of the diaphragm 64, a lever 66 operatively connected to said diaphragm in the manner indicated in Figure 1, is moved, so that an insulated contact-plate 67 (Figure 2) at the end of said lever 66 cuts in an additional portion of the resistance 28. The speed of the motor 27 is thereby reduced until the revoluble device 10 is in synchronism again with the master-clock-driven spindle 16, whereupon the relief outlet 65 is caused to be closed again to the normal extent. One terminal of the motor 27 is connected to the source 29 of current supply by a lead wire 92. A lead wire 93 goes from the other motor-terminal to the resistance contact-plate 67. The circuit is completed through the resistance 28, and a lead wire 93$^a$ from said resistance to the current-supply source 29.

When the revoluble device 10 and the master-clock-driven spindle 16 are in synchronism it is evident that there is no rotary displacement of said device 10 relatively to said spindle 16. There will be a relative displacement, however, as soon as the revoluble device 10 gets out of synchronism or attains synchronism with the master-clock-driven spindle 16. The progress of said displacement is utilized to open or close the relief outlet 65 by means including a closure 69. The relief outlet 65 is formed at the end of an elbow 70, which is part of the spindle 16, said spindle 16 being hollow and terminating at its lower end in an enlarged portion 71, as shown in Figure 6. By means of the elbow 70 the relief outlet 65 is offset from the axis of the spindle 16, so that, as said spindle rotates, the relief outlet 65 revolves about the axis of said spindle 16. The closure 69 for said relief outlet must obviously also revolve about the axis of said spindle 16, and, in order to be adjustable relatively to said outlet, is pivotally mounted upon a bracket 72, which, as best shown in Figure 3, is attached to the upper surface of the master disk 15. A projecting arm 74 extends from the lower end of the revoluble-device spindle 35, and serves the purpose of holding the closure 69 in normal relation to the relief outlet 65 when the revoluble device 10 and the master disk 15 are in synchronism. For this purpose the end of the arm 74 makes contact with a leaf 75, which forms an extension of the closure 69. The leaf 75 may be so formed and disposed relatively to the pivot of the closure 69 that the weight of said leaf causes said closure to open the relief outlet 65 when the end of the arm 74 is withdrawn from said leaf. An adjustable stop-screw 76 may limit the extent to which the closure 69 may move to open the relief outlet 65, and, as shown in Figures 4 and 5, said stop-screw may be threaded into an upstanding lug 78 of the relief-outlet elbow 70. Under standard conditions of the current supply for the motor 27, there will be a normal position of the resistance-regulating lever 66 relatively to the resistance 28, when said motor 27 drives the revoluble device 10 in synchronism with the master disk 15. Corresponding to said normal position of the resistance-regulating lever 66, there will be a normal inflation of the diaphragm 64 to maintain said normal position.

Figure 2:
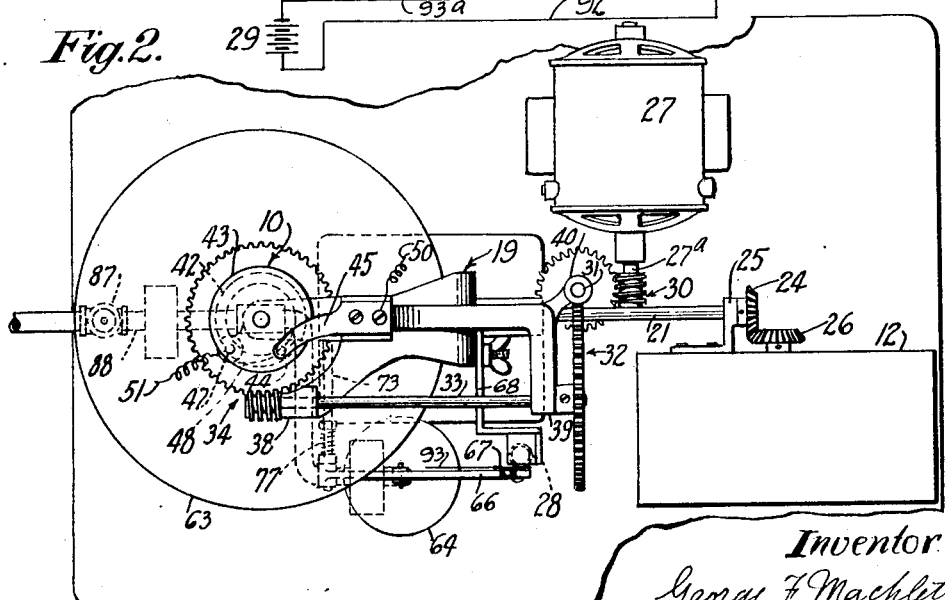
Figure 2 is a top-plan view of the apparatus shown in Figure 1, with the exception that in said Figure 2 the repeater clocks shown in Figure 1 are not shown.

To facilitate the establishment of the normal position of said lever 66 relatively to said resistance, said resistance may be shifted endwise by shifting a bracket 68, which supports said resistance, along the main-frame column to which said bracket may be shiftably secured. The lever 66 may be swung in a rigidly-fixed path by being secured to a fulcrum-shaft 73 journaled, as shown in Figures 1 and 2, in bearings provided in the main frame 19. A spring 77 (Figure 2) may counterbalance the unsupported weight of said lever 66.

When the revoluble device 10 rotates in synchronism with the master disk 15, the closure 69 for the relief outlet 65 should be in such position relatively to said outlet that the latter is not entirely closed. It is for the reason that the synchronizing device may be operative when said revoluble device lags behind said master disk that the relief outlet 65 is not to be entirely closed when said revoluble device 10 rotates in synchronism.

The extent to which the relief outlet 65 is normally open depends upon the volume and pressure of the air supply that is impressed upon the diaphragm 64, and also upon the amount of air and pressure that is dissipated through such normal opening of the relief outlet. It is evident that even with the closure 69 normally at a comparatively large distance from the orifice of the relief outlet 65 there may be enough reaction afforded by said closure against the air escaping through said relief outlet to cause the diaphragm 64 to be inflated to its normal extent. The normal position of the closure 69 relatively to the relief outlet 65 may, for example, be as represented in Figure 8.

When the revoluble device 10 lags behind the master device there will be a relative displacement of the closure-controlling arm 74 associated with the test disk 63 and the closure 69, causing the relief outlet to be closed, as for example, shown in Figure 9. As shown in Figure 9, the closure thus controlled, although still affording an opening from the relief outlet, reacts more positively against the air escaping through said relief outlet. In the ensuing increase of pressure in the manometric device the diaphragm 64 is caused to be expanded, thereby operating the resistance-regulating lever 66, so that the resistance in the motor-circuit is reduced, and the motor 27 is speeded up until the revoluble device 10 rotates in synchronism again with the master device. It will be evident that as the revoluble device attains such synchronism relatively to the master device, there will be an opposite displacement of the arm 74 relatively to the closure 69, causing said closure to reassume its normal position with respect to the relief outlet 65. The diaphragm 64 and the resistance-regulating lever than operate to maintain the re-established synchronous speed.

Owing to the usual escapement-controlled movement of the master-clock mechanism, the master disk 15 will be rotated intermittently in accordance with the beats of the master-clock-escapement mechanism. At each beat, therefore, it is evident that there will be a slight displacement of the closure-controlling arm 74 relatively to the relief-outlet closure 69 that said arm controls. This displacement, however, is oscillatory in character, and, being also slight in extent, should have no appreciable effect upon the diaphragm-regulating characteristics of said relief outlet 65. A well-known device which may be used, however, to damp the intermittent impulses which the master disk receives from the beats of the master-clock-escapement mechanism would be to make the disk 15 of sufficient mass, so that its inertia has a damping effect. In this case there would have to be either a loose or resilient connection in the train of parts whereby the master clock drives the spindle 16. Such a connection would serve the purpose of permitting the beats of the master clock to be unrestrained while at the same time transmitting the energy of said beats to the master disk 15 at such rate as the weighted master disk will avail itself of in its even rotation. Another way to smooth out the movement of the master disk 15 would be to increase the number of beats of the escapement-mechanism. That is to say, the escapement-mechanism, which ordinarily has one beat per second, may have the pendulum 14 associated therewith, so proportioned that there would be, for example, four beats per second. It is obvious that in this case the mechanism which drives the hands of the master clock would be proportioned accordingly.

The air which escapes through the relief outlet 65 is conveyed through the spindle 16, which, as before mentioned, is hollow and terminates at its lower end in the enlarged portion 71. As shown particularly in Figure 6, said enlarged portion 71 is part of the aforesaid mercury-seal device, whereby the air is conveyed to the relief outlet 65 without leakage, and at the same time without imposing friction upon the spindle 16. The mercury-seal device includes a cup-shaped member 80 having at its lower portion a nipple 81, which may be threaded into a T 82 of a pipe 88 which supplies air to the diaphragm 64. The nipple is projected upwardly within the cup-shaped member 80 in the form of a pipe 83, having its upper end 84 above the level of the sealing liquid 85 which is preferably mercury. The pipe 83 and the enlarged portion 71 of the spindle 16 form an annular space 86, which, as shown in Figure 6, is effectively sealed by said sealing liquid 85, which wells up within said space. By means of the sealing device just described, air may be conveyed from the stationary pipe 83 to the rotating spindle 16 without leakage and without imposing upon said pipe undue friction which would be occasioned if an ordinary stuffed-gland device were used. A valve 87 in the supply pipe 88 regulates the flow of air to the diaphragm and the relief outlet. By means of said valve 87, the rate at which the diaphragm 64 collapses or expands while the relief outlet 65 is opened or closed, may be controlled.

Both the disks 15 and 63 may have circumferential graduations 89. One or more pointers 90 on one of the disks may co-operate with the graduations on the other disk, so that an attendant may easily note whether the disks are rotating in synchronism, or to what extent they have deviated from synchronism. The graduations may for this purpose be numbered. Owing to the comparatively slow movement of the disks in some adaptations of the invention, as, for example, that adaptation illustratively shown herein, where the disks rotate at the rate of one revolution per minute, it may be desirable to have several of the pointers 90, so that one of said pointers will always be in view. The pointers would, in such case, be placed at even intervals around the disk, and said intervals could be similarly graduated. For instance, if there were three pointers they would be distributed at intervals of one hundred and twenty degrees, and each interval would be graduated and numbered from zero to one hundred and twenty, so that each pointer would read the same.

The apparatus herein shown, namely, the revoluble device 10, which is to be synchronized with the master clock, happens to be rotatable at the same speed as the master disk 15. It will be noted, however, that the invention may be used for synchronizing an apparatus that rotates at a higher or a lower speed than the master disk 15. If the apparatus rotates at a lower speed than the disk 15, which, in the herein-shown embodiment of the invention rotates at one revolution per minute, the speed of said master disk may be reduced correspondingly by suitably proportioning the gearing connecting said master disk to the clock. If the apparatus to be synchronized rotates at a higher speed than the master disk, as, for example, the alternators previously mentioned, a test disk may be geared to said apparatus in such manner that said test disk revolves at the same speed as the master disk 15. Said test disk would be analogous to the herein-shown disk 63.

As shown in my aforesaid co-pending application, a relay manometric device including a relay diaphragm may be controlled by the relief outlet 65 and its closure 69. In this case there would also be a main manometric device having a diaphragm to which the regulating lever 66 would be connected. Said main diaphragm would, as set forth in said co-pending application, be controlled by a main relief outlet, which would, in turn, be controlled by the relay diaphragm. As also set forth in the aforesaid co-pending application, a negative pressure, instead of a positive pressure, may be employed, said negative pressure being in the form of such degree of vacuum as is necessary for the operation of the type of apparatus herein set forth. If a negative pressure of vacuum is used, there would be a corresponding rearrangement of the relative positions of the closure 69 and the arm 74 which controls said closure, said rearrangement being made in the manner set forth in said co-pending application.

Means for creating or supplying the operating pressure imposed upon the diaphragm 64 are conventionally indicated at 94, Figure 1. In case a positive pressure is employed, said means may be either an air compressor or a reservoir for storing compressed air. If a negative pressure or vacuum is used to effect operation of the manometric pressure device, said means would be in the form of a suction-creating apparatus.

In Figure 10 are shown means whereby a master disk may be resiliently connected to the master clock to smooth out the impulses which said master disk receives from said master clock. The horizontal shaft 21 of Figure 1 may be made in two portions 21$^a$ and 21$^b$ (Figure 10), said portions being separated and each portion having at the point of separation a disk. One of the disks may carry a pin 95 which coacts with one side of a slot 96 in the other disk in the manner shown in Figure 10. A torsion spring 97, one end of which may be anchored to the master-clock-driven portion 21$^b$ and the other end of which may engage the pin 95, as shown in Figure 10, serves to resiliently connect the two portions. An additional bracket 98 may be provided to support the otherwise unsupported end of the portion 21$^b$. Similarly, the otherwise unsupported end of the portion 21$^a$ may be journaled in a suitable bearing formed in the main frame 19. If a damping device of the character just described is used, the master disk 15 will have to have sufficient mass to make said device effective to smooth out the rotation of said master disk. The width of the slot 96 should be such that the relative rotation of the two portions 21$^a$ and 21$^b$ is limited to the extent of movement impressed upon the portion 21$^b$ by a beat of the master clock. It may be possible under favorable conditions of exact proportions of mass of the master disk 15 to dispense with the use of the spring 97. It will be understood that the beats of the master clock arise from the escapement-controlled mechanism of the master clock. Said mechanism is conventionally indicated at 100, Figure 1.

When starting the revoluble device 10, it is desirable to release the arm 74, because said revoluble device usually cannot be immediately synchronized with the master disk 15. In this respect the pointers 90 are of service, because, as the revoluble device is brought into operation, said pointers and the graduations 89 co-operating therewith indicate to an attendant whether or not the revoluble device is moving in synchronism with the master disk 15. In order that the arm 74 may be disengageable from rotating with the revoluble device 10, said arm may be formed at the lower end of a stem 79, which passes through a central hole of the spindle 35 and has its upper end above the disk 43, as indicated in Figure 1. The upper end of said stem may be threaded to receive a clamp-nut 91, whereby said stem 79 and the arm 74 may be tightened when the pointers 90 indicate that the revoluble device is in synchronism with the master disk. It also results from making the arm 74 releasable that the extent to which the closure 69 normally keeps the relief outlet 65 open, may be adjusted with greater facility.

Variations may be resorted to within the scope of the invention, and portions of the improvements may be used without others.

Having thus described my invention, I claim:

1. The combination with a pair of separately-driven coaxially-mounted members to be rotated in synchronism relatively to one another, of a manometric air-pressure-device having a constantly open leak device through which the fluid continually wastes, said pressure device being controlled by the relative rotary displacement of said members as they get out of or into synchronous speed relatively to one another, and means whereby variations in the rate of wastage from said manometric pressure-device, thus controlled, substantially maintain said synchronous speed.

2. A synchronizing device including a rotating master member with which the speed of another rotating member is to be synchronized, a manometric air-pressure-device having a constantly open leak through which the air constantly wastes, said pressure-device co-operating with said members to respond to deviations from synchronism of the speed of said other member relatively to said master member, and means whereby said manometric pressure-device in responding to said deviations co-operate with said wasting device to cause the speed of said other member to be restored to synchronism with the speed of said master member.

3. A synchronizing device including a rotating master member with which the speed of another rotating member is to be synchronized, a manometric pressure diaphragm, means co-operating with said rotating members to control the pressure on said diaphragm so that said diaphragm responds to deviations from synchronism in the speed of said other member relatively to said master member, and means whereby said diaphragm in responding to said deviations causes said synchronism to be maintained.

4. A synchronizing device including a rotating master member with which the speed of another rotating member is to be synchronized, a manometric pressure diaphragm, means whereby the relative rotary displacement of said members as they get out or into synchronism with one another, controls the pressure on said diaphragm, and means whereby said diaphragm thus controlled causes said synchronism to be maintained.

5. A synchronizing device including a rotating master member with which the speed of another rotating member is to be synchronized, a manometric pressure-device having a diaphragm, said manometric pressure-device also having a relief outlet and closure therefor, said opening and closure co-operating with said rotating members to control the pressure on said diaphragm so that said diaphragm responds to deviations from synchronism in the speed of said other member relatively to said master member, and means whereby said diaphragm in responding to said deviations causes said synchronism to be maintained.

6. A synchronizing device including a rotating master member with which the speed of a second rotating member is to be synchronized, a manometric pressure-device having a diaphragm, said manometric pressure-device also having a relief outlet and an adjustable closure therefor, said closure and relief outlet rotating with one of said members, means on the other rotating member co-operating with said closure to adjust the same according to deviations from synchronism in the speed of said second member relatively to said master member, thereby causing said diaphragm to respond to said deviations, and means whereby said diaphragm in responding to said deviations causes said synchronism to be maintained.

7. A synchronizing device including a rotating master member with which the speed of a second rotating member is to be synchronized, a manometric pressure-device having a diaphragm, said manometric pressure-device also having a relief outlet and an adjustable closure therefor, said closure and relief outlet rotating with one of said members, means on the other rotating member co-operating with said closure to adjust the same according to deviations from synchronism in the speed of said second member relatively to said master member, thereby causing said diaphragm to respond to said deviations, said means on said other rotating member being disposed relatively to said closure, so that said relief outlet is partly open when said members rotate in synchronism, and means whereby said diaphragm in responding to said deviations causes said synchronism to be maintained.

8. A synchronizing device including a rotating master member with which the speed of another rotating member is to be synchronized, said other member being driven by a motor, a speed controller for said motor, a manometric pressure diaphragm, means operatively connecting said diaphragm and speed controller, whereby said diaphragm is enabled to regulate said controller, and means co-operating with said rotating members to control the pressure on said diaphragm, so that said diaphragm responds to deviations from synchronism in the speed of said other member relatively to said master member, thereby causing said controller to be regulated to maintain said synchronism.

9. A synchronizing device including a rotatable master member with which the speed of another rotatable member is to be synchronized, a master clock operatively connected to said master member to rotate said master member at a standard speed, a manometric pressure device having a constantly open variable leak device through which the fluid continually wastes, said pressure device being controlled by variations from synchronism in the speed of said other member relatively to said master member, and means whereby variations in the rate of wastage from said manometric pressure device thus controlled synchronize the speed of said other member relatively to said master member.

10. A synchronizing device including a rotating master member with which the speed of any given apparatus is to be synchronized, a rotatable test member driven by said apparatus, a manometric pressure device having a constantly open variable leak device through which the fluid continually wastes, said pressure device being controlled by variations from synchronism in the speed of said test member relatively to said master member, and means whereby variations in the rate of wastage from said manometric pressure device thus controlled synchronize the speed of said apparatus relatively to said master member.

11. A synchronizing device including a rotating master member with which the speed of any given apparatus is to be synchronized, said master member being operatively connected to a master clock and driven thereby, a rotatable test member driven by said apparatus, a manometric pressure device having a constantly open variable leak device through which the fluid continually wastes, said pressure device being controlled by variations from synchronism in the speed of said test member relatively to said master member, and means whereby variations in the rate of wastage from said manometric pressure device thus controlled synchronize the speed of said apparatus relatively to said master member.

12. A synchronizing device including a rotating master disk with which the speed of any given apparatus is to be synchronized, a rotatable test disk driven by said apparatus, and fluid wastage means controlled by a relative displacement of said disks, whereby said disks are kept in synchronism by reason of variations in rate of wastage of the fluid, said disks coaxially mounted and having index elements whereby their relative displacement may be observed.

13. A synchronizing device including a rotating master disk with which the speed of any given apparatus is to be synchronized, a rotatable test disk driven by said apparatus, and fluid wastage means controlled by a relative displacement of said disks, whereby said disks are kept in synchronism, by reasons of variations in rate of wastage of the fluid, said disks coaxially mounted and co-operating with index elements whereby their relative displacement may be observed.

14. A synchronizing device including a rotating master member with which the speed of another rotating member is to be synchronized, a manometric pressure device having a diaphragm controlled by variations in the speed of said other member relatively to said master member, and means for creating or supplying the operating pressure imposed upon said diaphragm.

15. A synchronizing device including a rotating master member with which the speed of another rotating member is to be synchronized, a manometric pressure device co-operating to synchronize said members, a relief outlet forming part of said manometric pressure device and rotating with one of said members, a main stationary air duct for said manometric pressure device, a branch of said air duct, said relief outlet being formed at the end of said branch, and a mercury-seal device included in said branch to permit rotation of said outlet.

16. A synchronizing device including a rotating master member with which the speed of a second rotating member is to be synchronized, a manometric pressure device having a relief outlet and an adjustable closure therefor, said closure and relief outlet rotating with one of said members, an arm normally fixed on the other rotating member and co-operating with said closure to adjust the same according to deviations from synchronism in the speed of said second member relatively to said master member, and means whereby said arm may be loosened while said second member is being brought up to synchronism and whereby also said arm may be tightened again, said means also enabling said arm to be positioned relatively to said closure.

17. The combination with a mechanism to be operated in synchronism with a master mechanism, of a manometric pressure device having a leak device through which the fluid wastes, and means called into action by failure of synchronous movement of said mechanisms, for controlling said leak, to vary the rate of wasting, whereby said manometric pressure device corrects the operation of said first-mentioned mechanism relatively to said master mechanism.

18. A synchronizing device including a rotating master member with which the speed of another rotating member is to be synchronized, a fluid-pressure device having a constantly open leak device through which the fluid continually wastes, said pressure device being controlled by variations from synchronism in the speed of said other member relatively to said master member, and means whereby variations in the rate of wastage from said pressure device, thus controlled, synchronize the speed of said other member relatively to said master member.

19. A synchronizing device including a master member rotating at a constant predetermined speed with which it is desired to synchronize the speed of another rotating member, said other member having driving means separate and distinct from the master-member-driving means, a fluid-pressure device having a constantly open leak device through which the fluid continually wastes, said pressure device being controlled by variations from synchronism in the speed of said other member relatively to said master member, and means whereby variations in the rate of wastage from said pressure device, thus controlled, regulate the driving means of said other member to keep the speed of said other member in synchronism with said master member.

20. The combination with a pair of separately-driven members to be rotated in synchronism, of a manometric pressure device having a constantly open leak device through which the fluid continually wastes, said pressure device being controlled by variations from said synchronism in the speed of one of said members relatively to the other member, and means whereby variations in the rate of wastage from said manometric pressure device, thus controlled, substantially maintains synchronism in the speed of rotation of said members.

GEORGE F. MACHLET.